(12) United States Patent
Fischer et al.

(10) Patent No.: US 9,821,511 B2
(45) Date of Patent: Nov. 21, 2017

(54) ULTRASONIC WELDING DEVICE WITH PREHEATING UNIT

(71) Applicant: Herrmann Ultraschalltechnik GmbH & Co. KG, Karlsbad (DE)

(72) Inventors: Thomas Fischer, Straubenhardt (DE); Arnold Schneider, Ettlingen-Schluttenbach (DE)

(73) Assignee: Hermann Ultraschalltechnik GmbH & Co. KG, Karlsbad (DE)

( * ) Notice: Subject to any disclaimer, the term of this patent is extended or adjusted under 35 U.S.C. 154(b) by 0 days.

(21) Appl. No.: 15/111,182

(22) PCT Filed: Feb. 3, 2015

(86) PCT No.: PCT/EP2015/052104
§ 371 (c)(1),
(2) Date: Jul. 12, 2016

(87) PCT Pub. No.: WO2015/117928
PCT Pub. Date: Aug. 13, 2015

(65) Prior Publication Data
US 2016/0368201 A1   Dec. 22, 2016

(30) Foreign Application Priority Data
Feb. 6, 2014   (DE) .................. 10 2014 101 503

(51) Int. Cl.
*B32B 37/00* (2006.01)
*B29C 65/08* (2006.01)
(Continued)

(52) U.S. Cl.
CPC .............. *B29C 65/08* (2013.01); *B29C 65/02* (2013.01); *B29C 65/087* (2013.01);
(Continued)

(58) Field of Classification Search
CPC ....... B29C 65/08; B29C 65/087; B29C 65/02; B29C 66/0242; B29C 66/1122;
(Continued)

(56) References Cited

U.S. PATENT DOCUMENTS

| | | | |
|---|---|---|---|
| 2003/0188819 A1 | 10/2003 | Campbell | |
| 2005/0247408 A1* | 11/2005 | Jung | ........................ B06B 3/00 |
| | | | 156/580.1 |

(Continued)

FOREIGN PATENT DOCUMENTS

| | | |
|---|---|---|
| DE | 199 06 873 A1 | 8/2000 |
| DE | 20 2011 108504 U1 | 4/2013 |
| WO | 2012/060876 A1 | 5/2012 |

OTHER PUBLICATIONS

English Translation of International Preliminary Report on Patentability, PCT/EP2015/052104, Nora Lindner, dated Aug. 11, 2016 (5 pages).

*Primary Examiner* — James Sells
(74) *Attorney, Agent, or Firm* — Paul & Paul

(57) ABSTRACT

The present invention concerns an apparatus for ultrasonic welding of at least two material webs comprising a processing sonotrode which can be excited with an ultrasonic vibration, a processing counterpart tool and a material web guide which is so designed that the material web can be passed through between the processing sonotrode and the processing counterpart tool, in which there is provided a device for heating at least one material web prior to the welding operation. To provide an ultrasonic welding apparatus which avoids the stated disadvantages and which nonetheless provides a high processing speed it is proposed according to the invention that the device for preheating at least one material web has a preheating sonotrode which can be excited with an ultrasonic vibration.

13 Claims, 1 Drawing Sheet

(51) Int. Cl.
*B29C 65/00* (2006.01)
*B29C 65/02* (2006.01)

(52) U.S. Cl.
CPC ...... *B29C 66/0242* (2013.01); *B29C 66/1122* (2013.01); *B29C 66/43* (2013.01); *B29C 66/81465* (2013.01); *B29C 66/83413* (2013.01); *B29C 66/92445* (2013.01); *B29C 65/088* (2013.01); *B29C 66/71* (2013.01); *B29C 66/919* (2013.01); *B29C 66/91411* (2013.01)

(58) Field of Classification Search
CPC .............. B29C 66/43; B29C 66/81465; B29C 66/83413; B29C 66/92445
USPC ........................................... 156/580.1, 580.2
See application file for complete search history.

(56) References Cited

U.S. PATENT DOCUMENTS

| | | | | |
|---|---|---|---|---|
| 2009/0250171 | A1* | 10/2009 | Wieduwilt | B29C 65/08 156/378 |
| 2013/0236684 | A1 | 9/2013 | Loughney | |
| 2015/0306816 | A1* | 10/2015 | Herrmann | B06B 3/00 156/580.1 |

* cited by examiner

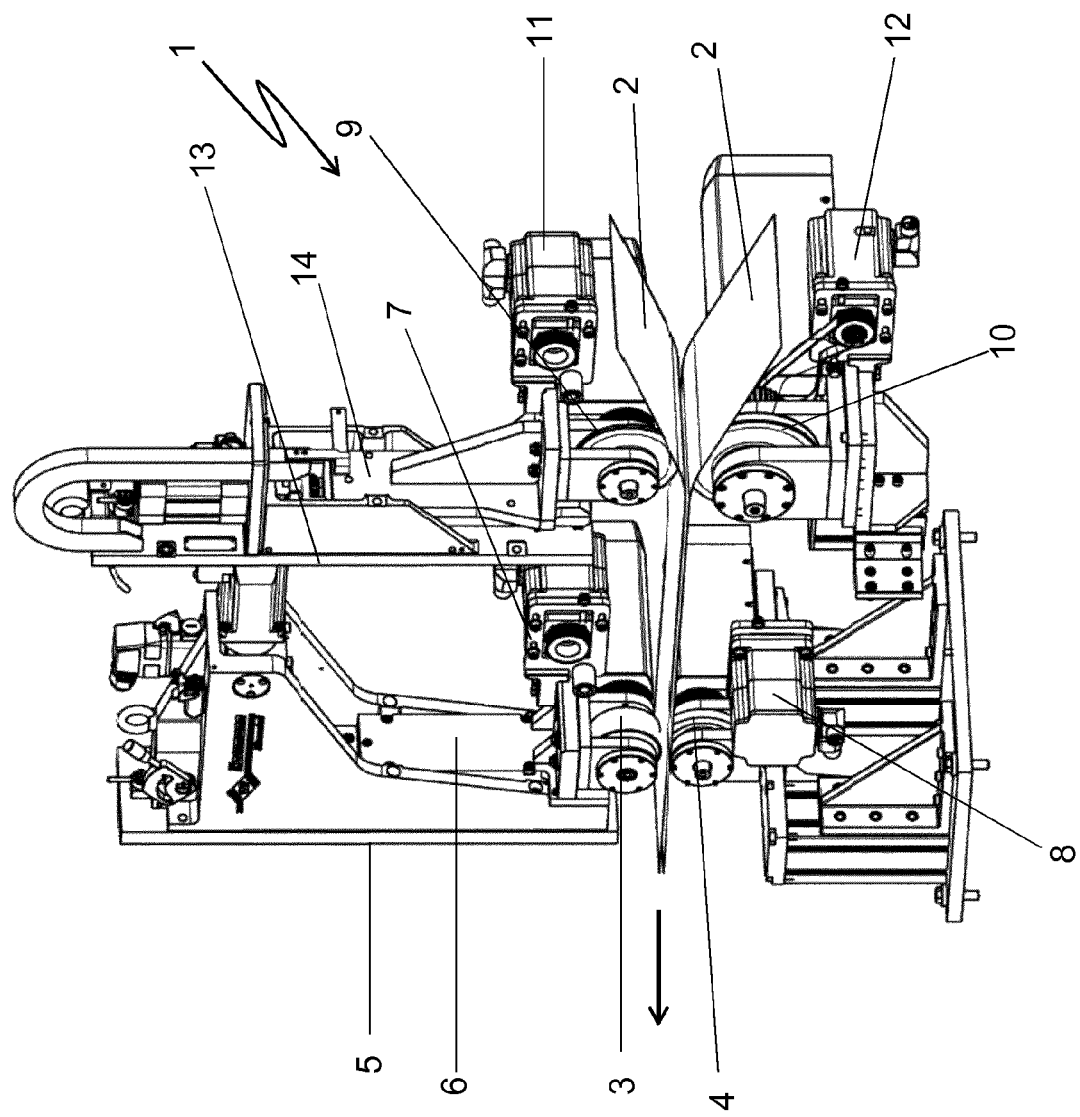

ULTRASONIC WELDING DEVICE WITH PREHEATING UNIT

CROSS-REFERENCE TO RELATED APPLICATION

This application is a 371 national stage application of International Application PCT/EP2015/052104, filed Feb. 3, 2015, and claims the priority of German Application No. 10 2014 101 503.7, filed on Feb. 6, 2014.

The present invention concerns an apparatus for ultrasonic welding of at least two material webs.

Such apparatuses can be used for example for ultrasonic welding of plastic material webs. Usually such apparatuses have a sonotrode which can be excited with an ultrasonic vibration, a counterpart tool and a material web guide which is so designed that the material webs to be welded can be passed through between the sonotrode and the counterpart tool.

To excite the sonotrode with an ultrasonic vibration, use is made of an ultrasound producing device comprising a generator which produces an electrical ac voltage and a converter which converts the electrical ac voltage into a mechanical vibration generally by means of piezoelectric elements. The converter can either be connected directly to the sonotrode or a so-called amplitude transformer can be connected therebetween, which influences only the mechanical vibration amplitude but not the mechanical vibration frequency.

Ultrasound is a mechanical vibration above the audible limit. The frequency range begins at about 20 kHz and extends to frequencies of 1 GHz. Such ultrasound frequencies are generally generated by means of piezoelectric sound transducers from electrical energy.

In order to effectively transmit the ultrasonic vibration by means of the ultrasonic vibration unit it is necessary to put the ultrasonic vibration unit into a state of resonance. The ultrasonic vibration unit has a plurality of natural frequencies, depending on the structure thereof. It is only if the converter produces a natural frequency of the ultrasonic vibration unit that resonant vibration of the ultrasonic vibration unit occurs. Therefore the converter and the ultrasonic vibration unit must be tuned to each other.

In general the counterpart tool is moveable relative to the sonotrode so that the material webs like for example film webs can be easily introduced between the sonotrode and the counterpart tool, which then for the welding operation apply the ultrasonic vibrations superposed by a welding force to the material webs. In that case basically a distinction is to be drawn between two processing methods, namely ultrasonic welding in which two or more material webs are welded together and ultrasonic cutting in which the material webs are severed by means of ultrasound. Not infrequently ultrasonic welding and ultrasonic cutting are effected at the same time by for example two parallel weld seams being formed in a packaging material and at the same time the material web being severed between the two parallel weld seams.

For example the above-mentioned apparatuses can be used in tubular bag packaging machines for welding the longitudinal seams. Here a tube for receiving a material to be packaged is formed from a material web, by the two longitudinal edges of the material web being joined together in overlapping relationship. In that case the material web edges to be joined are moved through between the sonotrode and the counterpart tool continuously. In general for that purpose both the sonotrode and also the counterpart tool have a welding surface in the form of a cylindrical surface.

When therefore reference is made hereinafter to welding material webs that also always means welding for example edges of the same material web. The only essential point is that the material to be welded comprises at least two layers which are to be joined together by means of the welding operation.

The term welding surface is used to denote that surface which in the welding operation comes into contact with the material webs to be processed.

At the present time hot sealing apparatuses are generally used for producing the transverse welded seam. Occasionally however ultrasonic processing apparatuses are also already used for producing transverse welded seams. These however are discontinuously operating sonotrodes, that is to say the sonotrode does not rotate but the substantially rectangular welding surface is periodically brought into contact with the material web to produce the transverse welded seam. In that case either the advance movement of the material web can be stopped during the welding operation or the sonotrode and the counterpart tool can be moved with the material web as it moves parallel thereto during the welding operation.

The use of ultrasonic sonotrodes for welding material webs has markedly increased the processing speed in the welding operation in comparison with the hitherto usual hot sealing method as, by means of ultrasonic sonotrodes, the rise in temperature necessary for the welding operation can be produced locally in almost point or line form in the interfaces of the material webs to be welded. That also permits the implementation of the continuous methods described in the opening part of this specification.

Nonetheless sufficient energy also has to be introduced here into the interface of the material webs to ensure reliable ultrasonic processing.

In order still further to increase the processing speed in ultrasonic processing the attempt has already been made to heat the material webs by means of a preheating device prior to the ultrasonic processing operation. For that purpose a heated air flow was directed on to the surfaces to be welded.

The processing speed can admittedly be increased by that method as less energy has to be introduced by way of the ultrasonic sonotrode into the interface region between the two material webs to be welded, by virtue of the preheating of the material webs. However producing the hot air is linked to high energy costs. In addition the use of hot air in the foodstuffs area is problematical as dust particles, microbes or the like possibly contained in the environment can now be blown directly on to the material to be processed.

Taking the above-described state of the art as the basic starting point therefore the object of the present invention is to provide an ultrasonic welding apparatus which avoids the above-mentioned disadvantages and which nonetheless makes a high processing speed available.

That object is attained in that the device for preheating at least one material web has a preheating sonotrode which can be excited with an ultrasonic vibration.

According to the invention therefore at least one of the two material webs is also preheated with an ultrasonic processing means. In the preheating operation temperatures which are below the melting temperature of the material to be welded are produced in the region of the material webs to be welded. If for example polyethylene is being welded preheating to about 80° C. could be effected. According to the invention however it is not the entire material web that is heated, but only a region which substantially includes the region to be welded in the subsequent step.

In a preferred embodiment there is provided a preheating counterpart tool which is associated with the preheating sonotrode, wherein the material web guide means is so adapted that at least one material web, preferably both material webs, can be passed through between the preheating sonotrode and the preheating counterpart tool.

In other words therefore the material webs to be welded are firstly passed through between the preheating sonotrode and the preheating counterpart tool which apply an ultrasonic vibration to the material to heat it. Directly subsequently the material webs are passed through between the processing sonotrode and the processing counterpart tool which implement welding of the material webs in the preheated region.

In a further preferred embodiment the processing sonotrode has a welding surface with a welding surface width a and the preheating sonotrode has a welding surface with a welding surface width b, wherein b is greater than a, wherein b is preferably greater by more than 50% and at best b is approximately twice as great as a.

The welding surface width substantially establishes the width of the region which is to be preheated or welded respectively. In spite of welding immediately following preheating nonetheless the thermal energy introduced in the region of the welding surface is given off into the surrounding regions by heat conduction within the material. It has therefore proven to be desirable for the welding surface width of the preheating sonotrode, that is to say that sonotrode which is responsible for preheating the material, to be wider than the welding surface of the sonotrode provided for the welding operation. Here too the situation admittedly involves heat conduction within the material directly after the preheating process whereby the material already cools down due to heat conduction in particular in the edge regions of the heated portion, but as the preheated region has been selected to be wider than the region to be welded, the region to be welded is heated in relation to the surrounding temperature substantially in the welding operation so that the welding operation can be effected markedly quicker by means of ultrasound by means of the processing sonotrode and therefore the processing speed or the material feed speed can be increased.

In principle the measure according to the invention is of advantage both in continuous methods and also in intermittently operating methods. It has been found however that the described advantages are particularly outstanding in a continuous method. In a preferred embodiment it is therefore provided that at least the processing sonotrode and preferably also the preheating sonotrode is in the form of a rotational sonotrode having a welding surface which is substantially in the form of a cylindrical surface.

In addition it is generally advantageous if at least the processing counterpart tool and preferably also the preheating counterpart tool is rotatable and has a welding surface which is substantially in the form of a cylindrical surface.

In order still further to increase the welding processing speed the processing tool itself can also be in the form of a sonotrode which can also be excited with an ultrasonic vibration. In that respect it is advantageous if the two sonotrodes involve different natural frequencies and are excited with different ultrasonic frequencies to avoid mutual vibration influence. Basically therefore the material web is welded by two oppositely disposed sonotrodes.

Such a configuration in respect of the counterpart tool can in principle also be envisaged for the preheating counterpart tool in order to accelerate preheating or to distribute the thermal energy more uniformly.

In an alternative preferred embodiment it is provided that the processing counterpart tool is also associated with the preheating sonotrode and the material web guide means is so adapted that the material web can firstly be passed through between the preheating sonotrode and the processing counterpart tool for preheating and then between the processing sonotrode and the processing counterpart tool for welding.

In other words two sonotrodes are associated with the processing counterpart tool which is preferably in the form of a cylindrical surface, with the two sonotrodes interacting in peripherally space relationship with the counterpart tool. The material web to be welded is thus firstly passed through between the counterpart tool and the preheating sonotrode, to preheat the material in a strip configuration in the interface region, and is then passed through between the processing sonotrode and the processing counterpart tool in order to implement ultrasonic welding within the preheated region. That embodiment can only be used however with material webs which have sufficient flexibility.

In principle however the spacing between the preheating unit comprising the preheating sonotrode and the preheating counterpart tool and the processing unit comprising the processing sonotrode and the processing counterpart tool should be as small as possible, preferably smaller than 1 m, in order to avoid the heat introduced into the material by the preheating unit already having left the welding region before processing. It may possibly be advantageous if there is provided a device for pressing together the material webs which have been preheated but not yet processed, between the preheating unit and the processing unit. Such a device can for example comprise one or more pressing rollers or pressing belts.

In addition for many materials it may be advantageous if there is provided a device for rotating the preheating sonotrode and for rotating the processing sonotrode, wherein the device is so adapted that the peripheral speed of the processing sonotrode is greater than the peripheral speed of the preheating sonotrode. That is advantageous in particular when welding materials which are already stretched, that is to say become longer, during the preheating operation, by virtue of the pressure applied to the material by the preheating sonotrode and the preheating counterpart tool.

Further advantages, features and possible uses of the present invention will be clearly apparent from the description hereinafter of a preferred embodiment and the accompanying FIGURE in which:

FIG. 1 shows a perspective view of a preferred embodiment of the invention.

FIG. 1 shows an embodiment of an ultrasonic welding apparatus 1 according to the invention. It serves to weld two material webs 2 together.

Welding is effected by means of a processing sonotrode 3 and a processing counterpart tool 4. Both the processing sonotrode 3 and also the processing counterpart tool 4 have welding surfaces in the form of cylindrical surfaces and are rotated about their longitudinal axis by means of the drives 7, 8. In the illustrated embodiment the axis of rotation of the processing counterpart tool 4 is connected to the machine support frame structure while the processing sonotrode 3 can be moved in a vertical direction relative to the holder 5 by means of the carriage 6. Thus the desired welding gap can be adjusted by means of the carriage 6 between the processing sonotrode 3 and the processing counterpart tool 4. The processing sonotrode 3 is caused to perform an ultrasonic vibration by means of a converter (not shown) so that the material webs 2 which are moved through the apparatus in the direction of the arrow are welded between the processing sonotrode 3 and the counterpart tool 4. In that case the peripheral speed of the processing sonotrode 3 and the counterpart tool 4 is equal to the speed of movement of the material webs 2.

It will be appreciated that the speed of movement of the material webs cannot be increased just as desired as, during processing of the material web by the processing sonotrode 3, sufficient energy has to be introduced into the material webs 2 to guarantee welding of the two material webs.

To increase the advance speed of the material webs the embodiment, in accordance with the invention, has a preheating sonotrode 9 and a preheating counterpart tool 10. The preheating sonotrode 9 and the preheating counterpart tool 10 also have welding surfaces in the form of cylindrical surfaces and are rotatable about their axis of rotation by means of the drives 11, 12. When the material webs 2 are being transported through the ultrasonic welding apparatus in the direction indicated by the arrow therefore the material webs are firstly processed by the preheating sonotrode 9 and the preheating counterpart tool 10 and thereafter by the processing sonotrode 3 and the processing counterpart tool 4. The preheating sonotrode 9 can also be moved in the vertical direction relative to the holder 13 by means of the carriage 14 while the preheating counterpart tool 10 cannot be moved in the vertical direction.

The preheating sonotrode 9 and the preheating counterpart tool 10 are intended to preheat the material webs 2 in the region which is to be ultrasound-welded by the processing sonotrode 3 and the processing counterpart tool 4. The preheating sonotrode 9 which is also acted upon with an ultrasonic vibration therefore delivers vibration energy to the material webs 2 in the material processing operation so that as a result the two material webs 2 are preheated in a strip-shaped region, the width of which is determined by the welding surface width of the preheating sonotrode 9 and the preheating counterpart tool 10 respectively and which extends in the material advance direction.

In that respect for example when processing polyethylene (PE) temperatures of about 80° C. are reached. What is essential in that respect is that the melting temperature of the material is not exceeded as otherwise welding would already be effected.

The preheating sonotrode 9 and the preheating counterpart tool 10 are only intended for preheating the material webs 2. The actual welding operation is then effected by means of the processing sonotrode 3 and the counterpart tool 4 which carry out the welding operation exactly within the preheated line-shaped region. As the material webs are already preheated in that line-shaped region less vibration energy has to be introduced into the material webs 2 for welding thereof so that overall it is possible to operate with a higher material advance speed without reducing the weld quality.

While the processing sonotrode and/or the processing counterpart tool which are responsible for the welding operation can have a welding surface which is contoured with projections, it is rather of advantage for the preheating sonotrode and the preheating counterpart tool to have a contour which is constant in the peripheral direction in order to achieve uniform preheating.

By way of example the preheating sonotrode in a section extending perpendicularly to the material web could be of a bell-shaped or ridge-like or bulging cross-section.

LIST OF REFERENCES

1 ultrasonic welding apparatus
2 material webs
3 processing sonotrode
4 processing counterpart tool
5, 13 holder
6, 14 carriage
7, 8, 11, 12 drive
9 preheating sonotrode
10 preheating counterpart tool

The invention claimed is:

1. Apparatus for ultrasonic welding of at least two material webs comprising a processing sonotrode which can be excited with an ultrasonic vibration, a processing counterpart tool and a material web guide which is so designed that the material web can be passed through between the processing sonotrode and the processing counterpart tool, in which there is provided a device for heating at least one material web prior to the welding operation, wherein the device for preheating at least one material web has a preheating sonotrode which can be excited with an ultrasonic vibration, characterised in that the processing sonotrode has a welding surface with a welding surface width a and the preheating sonotrode has a welding surface with a welding surface width b, wherein b is greater than a.

2. Apparatus as set forth in claim 1 characterised in that there is provided a preheating counterpart tool which is associated with the preheating sonotrode, wherein the material web is so adapted that at least one material web, can be passed through between the preheating sonotrode and the preheating counterpart tool.

3. Apparatus as set forth in claim 2 characterised in that the processing counterpart tool is also associated with the preheating sonotrode and the material web guide means is so adapted that the material web can firstly be passed through between the preheating sonotrode and the processing counterpart tool for preheating and then between the processing sonotrode and the processing counterpart tool for welding.

4. Apparatus as set forth in claim 1 characterised in that at least the processing sonotrode is in the form of a rotational sonotrode having a welding surface which is substantially in the form of a cylindrical surface.

5. Apparatus as set forth in claim 4 characterised in that at least the processing counterpart tool is rotatable and has a welding surface which is substantially in the form of a cylindrical surface.

6. Apparatus as set forth in claim 1 characterised in that the processing counterpart tool is in the form of a further processing sonotrode which can be excited with an ultrasonic vibration.

7. Apparatus as set forth in claim 5 characterised in that there is provided a device for rotating the preheating sonotrode and for rotating the processing sonotrode, wherein the device is so adapted that the peripheral speed of the processing sonotrode is greater than the peripheral speed of the preheating sonotrode.

8. Apparatus as set forth in claim 1 wherein b is greater than a by more than 50%.

9. Apparatus as set forth in claim 1 wherein b is approximately twice as great as a.

10. Apparatus as set forth in claim 2 wherein both material webs can be passed through between the preheating sonotrode and the preheating counterpart tool.

11. Apparatus as set forth in claim 4 wherein the preheating sonotrode is in the form of a rotational sonotrode having a welding surface which is substantially in the form of a cylindrical surface.

12. Apparatus as set forth in claim 5 wherein the preheating counterpart tool is rotatable and has a welding surface which is substantially in the form of a cylindrical surface.

13. Apparatus as set forth in claim 6 wherein the processing sonotrode and the further processing sonotrode have different natural frequencies.

* * * * *